United States Patent [19]

Oakley

[11] 4,003,613
[45] Jan. 18, 1977

[54] APPLIANCE CONTROL CONSOLE STRUCTURE

[75] Inventor: John G. Oakley, Coloma, Mich.

[73] Assignee: Whirlpool Corporation, Benton Harbor, Mich.

[22] Filed: Mar. 17, 1976

[21] Appl. No.: 667,904

[52] U.S. Cl. .............................. 312/293; 312/214; 312/223; 312/257 A; 52/595

[51] Int. Cl.² ........................................ A47B 77/08

[58] Field of Search .......... 312/293, 311, 253, 223, 312/279, 214, 257 A; 211/177; 52/754, 595, 314

[56] References Cited

UNITED STATES PATENTS

| | | | |
|---|---|---|---|
| 2,840,435 | 6/1958 | Campbell | 312/223 |
| 3,067,667 | 12/1962 | Krehbiel | 312/223 |
| 3,095,838 | 7/1963 | Paulos et al. | 312/214 |
| 3,173,730 | 3/1965 | Collins | 312/223 |
| 3,253,874 | 5/1966 | Czech | 312/223 |
| 3,420,028 | 1/1969 | Barker | 52/595 |
| 3,535,844 | 10/1970 | Glaros | 52/595 |
| 3,807,113 | 4/1974 | Turner | 52/314 |
| 3,851,435 | 12/1974 | Roberts et al. | 52/754 |

*Primary Examiner*—Paul R. Gilliam
*Assistant Examiner*—Victor N. Sakran
*Attorney, Agent, or Firm*—Wegner, Stellman, McCord, Wiles & Wood

[57] ABSTRACT

An appliance control console structure adapted to be mounted on a mounting portion of the appliance for suitably housing the appliance electrical controls. The structure includes a pair of end cap assemblies, a mounting plate extending between the end cap assemblies and carrying the electrical controls, and a cover. The end cap assemblies may be formed of two portions with the portion of the space within the console structure in which the electrical controls are disposed being confronted by only one of the two end cap portions. The end cap portions may include integral structure for rigidly locking the portions together.

16 Claims, 11 Drawing Figures

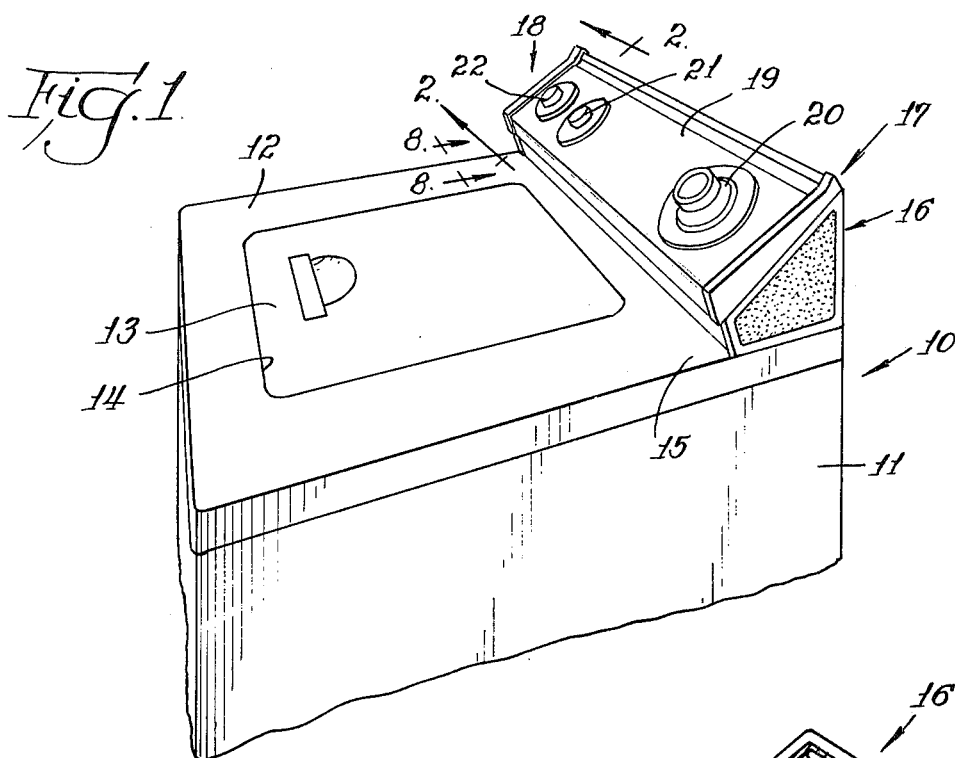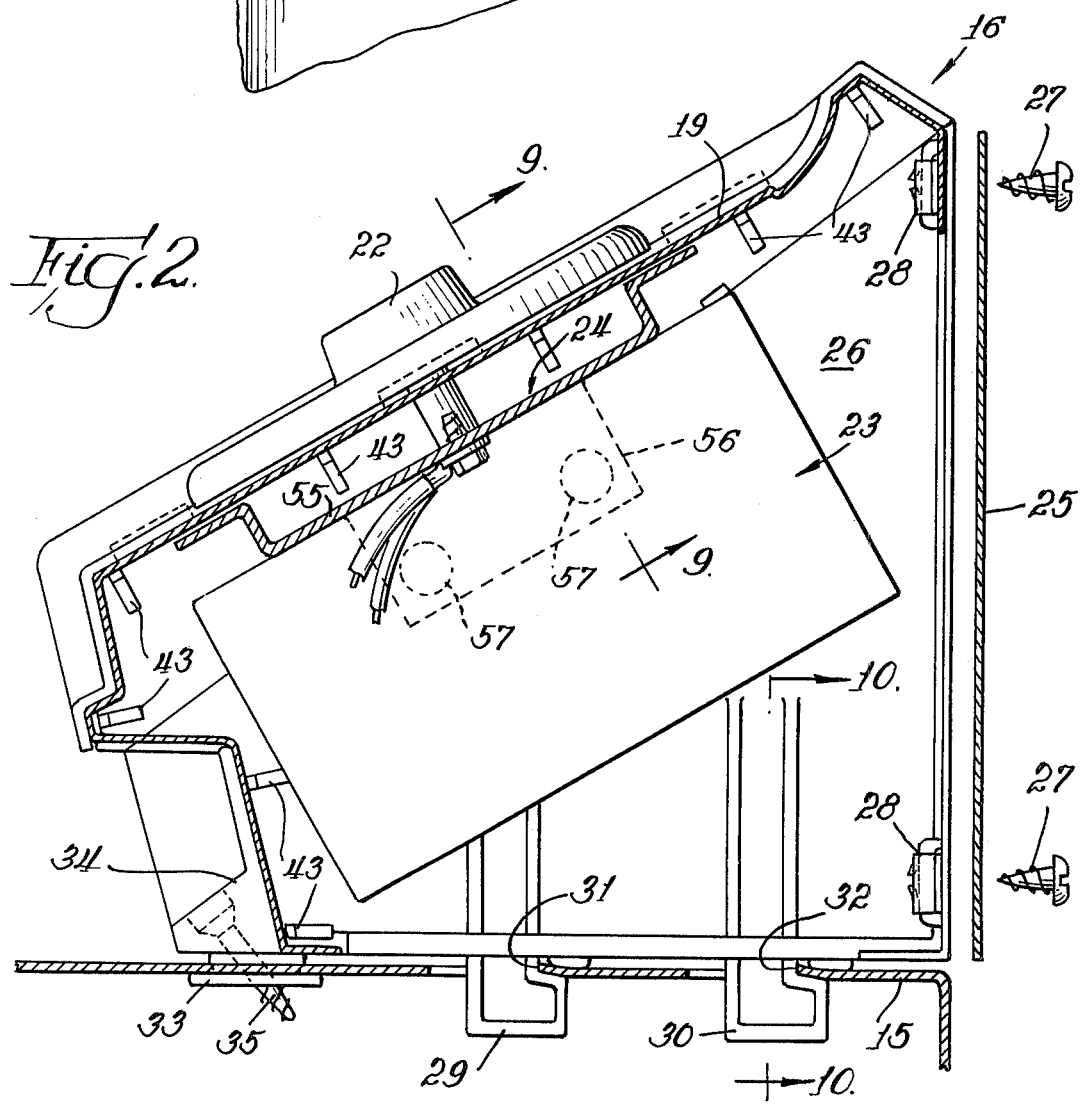

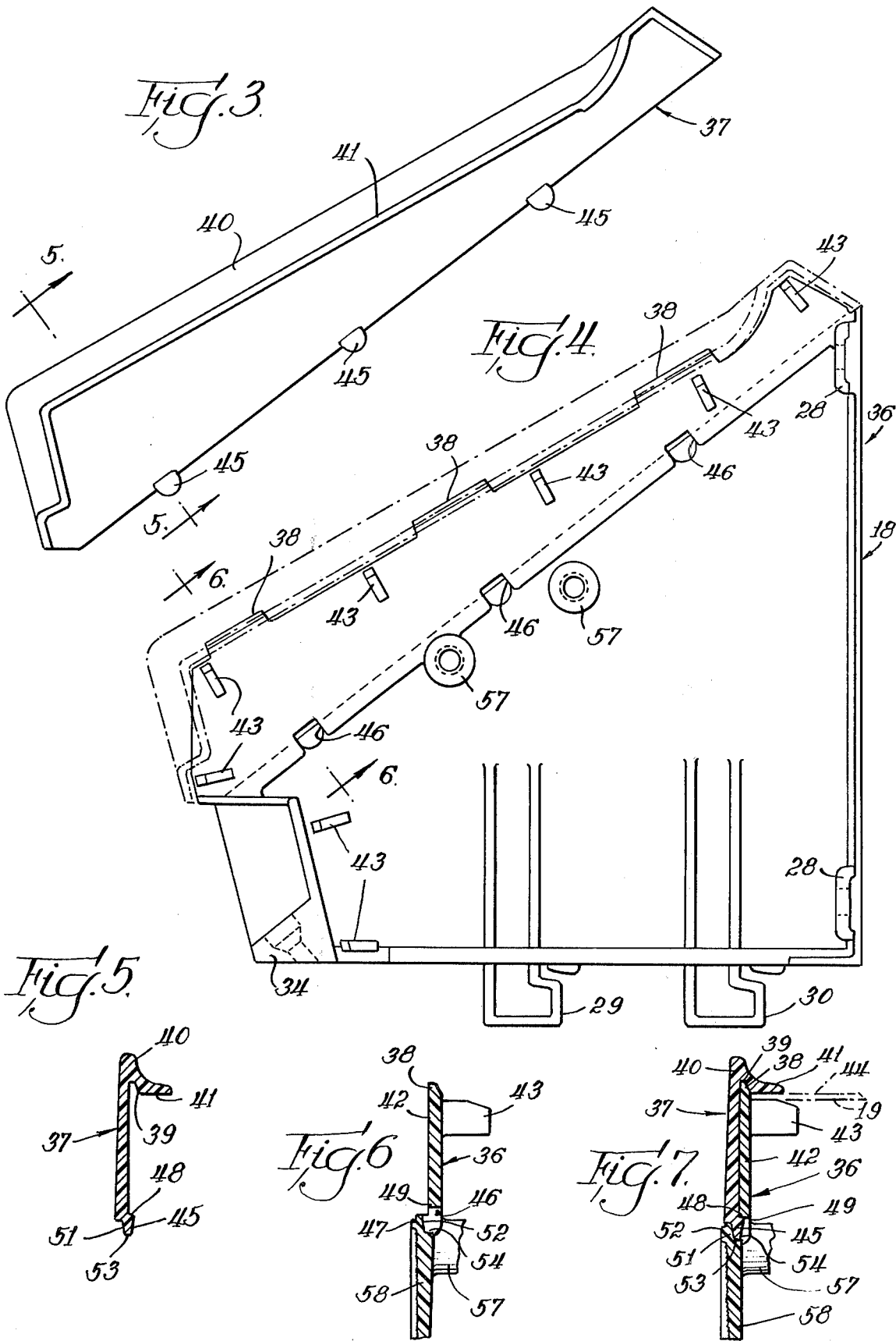

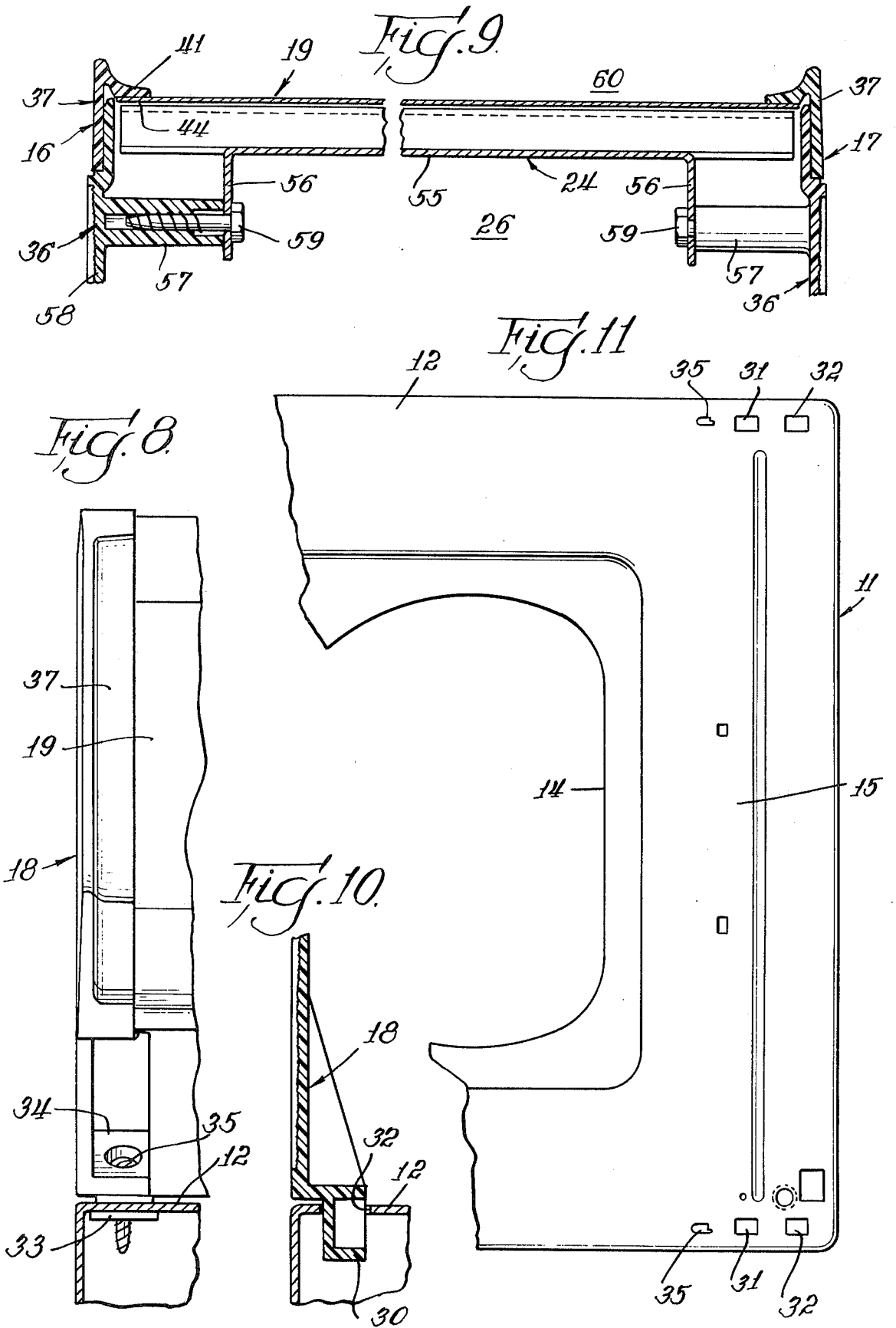

APPLIANCE CONTROL CONSOLE STRUCTURE

BACKGROUND OF THE INVENTION

1. Field of the Invention

This invention relates to electrical appliances and is particular to control console structures for use in electrical appliances.

2. Description of the Prior Art

In certain forms of electrical appliances, such as washers and dryers, the electrical controls are provided in a console carried on a rear portion of the appliance cabinet. The console effectively defines a housing structure with manual control knobs and similar elements extending forwardly therefrom for manipulation by the user of the appliance in controlling the operation thereof.

One form of such console is shown in U.S. Pat. No. 3,173,730 of Lawrence R. Collins.

It is desirable in such console structures to permit utilization thereof with different models of the appliances and it is further desirable in such consoles to provide a decorative appearance.

One form of highly decorative console wall means comprises a metal-plated plastic wall portion. The synthetic resin material, however, is relatively expensive and, further, is not highly fire-resistant. One solution to this problem is to provide the console wall structure to be formed of different materials in different portions thereof, with the different portions being suitably joined. Examples of fastening means for effecting such joinder of wall members and the like are those shown in U.S. Pat. No. 3,807,113 of Edward C. Turner, and U.S. Pat. No. 3,851,435 of H. Evan Roberts et al.

SUMMARY OF THE INVENTION

The present invention comprehends an improved appliance control console structure which is extremely simple and economical of construction while yet providing facilitated modified use with different models of appliances and improved highly aesthetic decorative effect.

The control console structure of the present invention includes a mounting plate which divides the console space into first and second spaces, with the electrical controls being disposed in the second space and with the second space confronting only fire-resistant portions of the console wall means.

More specifically, the console wall means may include end cap assemblies made up of first and second members with the member confronted by the electrical control space being formed of a highly fire-resistant material. The invention thus permits the other end cap member to be formed of a synthetic resin suitable for metal plating, which, as discussed above, may have a relatively lower fire-resistant characteristic.

The end cap assembly members may be interlocked by suitable integral means formed therein. The opposite ends of the mounting plate may be secured to the respective end cap assemblies, and a cover means may be retrained between the end cap assemblies to define the forwardly exposed wall means of the console.

A rear closure panel may be provided for closing the rear of the control means space. Opposite end portions of the rear panel may be removably secured to the end cap assemblies by suitable removable securing elements.

The end cap assemblies may include securing portions adapted to interlock with suitable slots in the appliance to permit facilitated mounting of the console to the appliance cabinet.

The console structure of the present invention, thusly, is extremely simple and economical while yet providing the highly desirable features discussed above.

BRIEF DESCRIPTION OF THE DRAWING

Other features and advantages of the invention will be apparent from the following description taken in connection with the accompanying drawing wherein:

FIG. 1 is a fragmentary perspective view of an appliance having a control console structure embodying the invention;

FIG. 2 is a fragmentary enlarged vertical section thereof illustrating the installation of the rear closure panel;

FIG. 3 is a front elevation of the upper, second end cap member;

FIG. 4 is an end elevation of the lower, first end cap member with the second end cap member being shown in broken lines in assembly therewith;

FIG. 5 is a section taken substantially along the line 5—5 of FIG. 3;

FIG. 6 is a fragmentary section taken substantially along the line 6—6 of FIG. 4;

FIG. 7 is a fragmentary section similar to that of FIG. 6 but with the second end cap member installed in association with the first end cap member;

FIG. 8 is a fragmentary vertical section taken substantially aong the line 8—8 of FIG. 1;

FIG. 9 is a fragmentary section taken substantially along the line 9—9 of FIG. 2;

FIG. 10 is a fragmentary vertical section taken substantially along the line 10—10 of FIG. 2; and FIG. 11 is a fragmentary top plan view of the top wall of the appliance prior to the installation of the control console structure thereon.

DESCRIPTION OF THE PREFERRED EMBODIMENT

In the exemplary embodiment of the invention as disclosed in the drawing, an appliance generally designated 10 illustratively comprises a top-loading washing machine having an outer cabinet 11 provided with a top wall 12 having a selectively manipulatable closure 13 closing a top opening 14 in the wall 12. The top wall defines a rear portion 15 on which is mounted a control console generally designated 16. The present invention defines an improved control console structure which is extremely simple and economical of construction while yet providing a highly pleasing appearance in such an appliance.

As shown in FIG. 1, console 16 includes a pair of end wall assemblies generally designated 17 and 18, and a cover member 19. Control knobs 20, 21 and 22 may be mounted to be disposed forwardly of the cover 19 for suitable manipulation by the user of the appliance.

Referring now to FIG. 2, the electrical controls generally designated 23 may be mounted within the console to extend downwardly and rearwardly from a mounting plate 24, which is disposed inwardly of the cover 19. A rear closure panel 25 may be provided for rearwardly closing the inner space 26 within the console. As shown, the closure panel 25 may be secured to the end cap assemblies by suitable screws 27 received in suitable female portions 28 of the end cap assemblies.

As further shown in FIG. 2, the console 16 may be secured to the appliance top wall portion 15 by suitable depending tongues 29 and 30 received in suitable slots 31 and 32 in the top wall portion. A suitable screw 33 may be extended through a front portion 34 of each end wall assembly for threaded engagement with a suitable opening 35 in the cabinet top wall portion 15.

Each end cap assembly is comprised of a lower, first member 36 and an upper, second member 37. Members 36 and 37 are adapted to be effectively locked together in the end cap assembly and, in the illustrated embodiment, may be so interlocked by simple snap-fitted engagement therebetween. More specifically, first end cap member 36 is provided with a plurality of upstanding tongues 38 adapted to be received in a downwardly opening slot 39 in an upper portion 40 of the second end cap member 37, as seen in FIGS. 3–7.

Top portion 40 of the second end cap member includes a turned flange 41 and the upper portion 42 of the first end cap member 36 is provided with inturned supports 43, which are spaced slightly below the flange 41 in the assembled relationship of the end cap members, as shown in FIG. 7, to receive the end portion 44 of the cover 19 for retaining the cover between the end cap assemblies in the assembled relationship thereof in the console 16, as shown in FIG. 1.

As shown in FIGS. 3 and 5, the upper end cap member 37 defines a plurality of depending tongues 45. The tongues are adapted to be received in corresponding slots 46 defined in an offset portion 47 of the lower end cap member 36.

As best seen in FIG. 7, each tongue 45 defines an upper shoulder 48 cooperating with a downwardly facing surface 49 of slot 46, and an outer surface 51 cooperating with an inwardly facing surface 52 of slot 46. The lower end surface 53 of tongue 45 may engage an upwardly facing surface 54 of slot 46.

Thus, as can be seen in FIG. 7, the end cap members are assembled without the need for tools by the simple snap-on mounting of the upper end cap member 37 to the lower end cap member 36 by inserting the lower end cap member upper portion 38 into the slot 39 of the upper end cap member while concurrently inserting the tongue 45 into the slot 46 so as to cause an interlocked engagement between the tongue 45 and the interlocking surfaces of the slot.

As shown in FIG. 9, the mounting plate 24 includes a mid-portion 55 to which the electrical control elements 23 are adapted to be mounted. At its opposite ends, the mounting plate is provided with downturned flanges 56 adapted to be mounted to posts 57 formed integrally in the lower portion 58 of the lower end cap member 36. The flanges may be secured to the posts by suitable threaded securing means, such as screws 59.

Thus, the control console 16 is readily adapted to be mounted on any one of a number of different types of appliances 10. As the upper end cap members may be formed of suitable materials permitting plating and the like for highly decorative effects, the console may be readily arranged for use with such different appliances with different highly aesthetic appearances. The end cap members may be readily assembled without the need for tools or expensive assembly operations to provide facilitated arrangement of the end cap assemblies with any one of a plurality of different upper end cap members.

The console, as discussed above, effectively defines an inner space 26 which is confronted at its opposite ends by only the first end cap members 36. As shown in FIG. 9, the upper end cap members 37 may extend outwardly of the upper portion of the lower end cap members so as to have a substantial vertical extent while yet not being exposed to the space 26. The invention comprehends that the upper end cap members may extend not only outwardly of the lower end cap members, but also above the lower end cap members so as to effectively define an outer space 60 between the upwardly extending portions of the upper end cap members. As the controls are disposed in the inner space 26 bounded by the cover member 19, the cover member effectively precludes exposure of the upper portions of the upper end cap members 37 to space 26, thereby permitting the upper end cap members to be formed of lesser fire-resistant material, as discussed above.

The foregoing disclosure of specific embodiments is illustrative of the board inventive concepts comprehended by the invention.

I claim:

1. Control console structure for use with an appliance having a mounting portion, said console structure comprising:

a pair of end cap assemblies each assembly including a first member, a second member, and locking means for locking said first and second members together;

means for securing said end cap assemblies to the appliance mounting portion in spaced relationship to each other; and wall means extending between said spaced end cap assemblies for mounting and enclosing appliance control means, said wall means including a cover means having opposite ends mounted to said spaced end cap assemblies.

2. The control console structure of claim 1 wherein said wall means includes a mounting plate for carrying the appliance control means.

3. The control console structure of claim 1 wherein said wall means includes a mounting plate for carrying the appliance control means, said mounting plate having opposite ends mounted to said spaced end cap assemblies.

4. The control console structure of claim 1 wherein said wall means includes a mounting plate for carrying the appliance control means, said mounting plate having opposite ends mounted to said spaced end cap assemblies and forming with said first end cap members a conrol space for receiving the appliance control means, said second end cap members being free of communication with said control space.

5. The control console structure of claim 1 wherein said wall means includes a mounting plate for carrying the appliance control means, said mounting plate having opposite ends mounted to said spaced end cap assemblies and forming with said first end cap members a control space for receiving the appliance control means, said second end cap members being free of communication with said control space, said first end cap members being formed of a fire-resistant material, said second end cap members being formed of a material having less fire resistance than that of said first end cap member material.

6. The control console structure of claim 1 wherein said locking means comprise male and female means formed integrally with said end cap members.

7. The control console structure of claim 1 wherein said locking means comprise snap fitting means.

8. The control console structure of claim 1 wherein said locking means comprise interfitted tongue and slot means.

9. The control console structure of claim 1 wherein said first and second end cap members are formed of different materials.

10. The control console structure of claim 1 wherein said locking means comprises a first surface on said first end cap member, a second surface on said second end cap member engaging said first surface, said second member defining slot means, first tongue means on said first member engaging said slot means, second tongue means including a shoulder portion on said second member, and said first member defining aperture means for receiving said second tongue means, said aperture means including a first surface engaged by said shoulder portion of said second tongue means in a first direction and a second surface laterally spaced from said first and second member surfaces engaged by said second tongue means remotedly of said shoulder portion in a second direction substantially normal to said first direction, whereby said first and second members are rigidly locked together by the cooperative engagement between said slot means and said first tongue means, between said second tongue means and said aperture means, and between said first and second member surfaces.

11. The control console structure of claim 11 wherein said second tongue means defines a side surface comprising the portion of said second tongue means engaged by said second surface of said aperture means.

12. The control console structure of claim 11 wherein said second tongue means defines a side surface remote from said shoulder portion comprising the portion of said second tongue means engaged by said second surface of said aperture means.

13. An appliance control console comprising:
electrical appliance controls;
wall means carrying said controls; and
end cap means at opposite sides of said wall means and having a first, fire-resistant portion and a second portion less fire resistant than said first portion, the space between said end caps being divided into an outer space portion and an inner space portion, said controls being disposed in said inner space portion and said second portion of each end cap means confronting only said outer space portion, said wall means including a cover having opposite ends engaging said end cap means for retention therebetween.

14. The appliance control console of claim 14 wherein a removable closure panel is provided extending between said end cap means defining a further boundary of said inner space portion.

15. The appliance control console of claim 14 wherein said wall means includes a mounting plate and removable securing means are provided for removably securing said opposite ends of the mounting plate to said end cap means.

16. The appliance control console of claim 14 wherein depending securing means are provided on said end cap means for securing the end cap means to a subjacent wall.

* * * * *

UNITED STATES PATENT AND TRADEMARK OFFICE
CERTIFICATE OF CORRECTION

PATENT NO. : 4,003,613

DATED : January 18, 1977

INVENTOR(S) : John G. Oakley

It is certified that error appears in the above-identified patent and that said Letters Patent are hereby corrected as shown below:

```
Column 5, line 33, change "11" to -- 10 --.

Column 6, line 3,  change "11" to -- 10 --;
         line 22, change "14" to -- 13 --;
         line 26, change "14" to -- 13 --;
         line 31, change "14" to -- 13 --.
```

Signed and Sealed this ninth Day of August 1977

[SEAL]

Attest:

RUTH C. MASON
*Attesting Officer*

C. MARSHALL DANN
*Commissioner of Patents and Trademarks*